United States Patent
Stähli et al.

[11] Patent Number: 5,906,844
[45] Date of Patent: May 25, 1999

[54] COFFEE MAKER

[75] Inventors: Hans-Peter Stähli, Schliern; Samuel Zenger, Murten, both of Switzerland

[73] Assignee: Blaser Cafe AG—A Swiss Corporation, Bern, Switzerland

[21] Appl. No.: 08/641,849

[22] Filed: May 2, 1996

[51] Int. Cl.⁶ .................... B65B 29/02; A23F 5/00
[52] U.S. Cl. ................ 426/77; 426/433; 99/295; 99/307; 206/0.5
[58] Field of Search ............... 426/77, 433, 595, 426/81; 99/294, 295, 302 R, 304, 307; 206/0.5

[56] References Cited

U.S. PATENT DOCUMENTS

| | | | |
|---|---|---|---|
| 3,387,553 | 6/1968 | Tavera | 99/295 |
| 3,443,508 | 5/1969 | Reynolds et al. | 99/295 |
| 4,532,142 | 7/1985 | Dean | 99/295 |
| 4,867,993 | 9/1989 | Nordskog | 99/295 |
| 4,875,408 | 10/1989 | McGee | 426/77 |
| 4,975,296 | 12/1990 | Newman et al. | 426/77 |
| 5,298,267 | 3/1994 | Gruenbacher | 99/295 |
| 5,633,026 | 5/1997 | Gruenbacher et al. | 99/295 |
| 5,669,287 | 9/1997 | Jefferson, Jr. et al. | 99/299 |

*Primary Examiner*—Anthony J. Weier

[57] ABSTRACT

A coffee maker has container (3, 5), which can be closed pressure-tight, for holding powdered coffee (12). Container (3) is equipped on the inside with screen (10) on the bottom and side wall. Flat, preferably round filter pouch (11) is inserted into container (3) such that the bottom and side wall of container (3) are completely covered. Filter pouch (11) is held by screen (10) at a distance to the inside wall of the container so that the coffee can flow out easily on all sides. The hot water is injected with nozzle head (6) at a 45° angle to the center axis of the container.

12 Claims, 1 Drawing Sheet

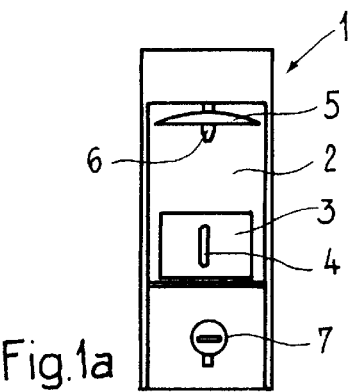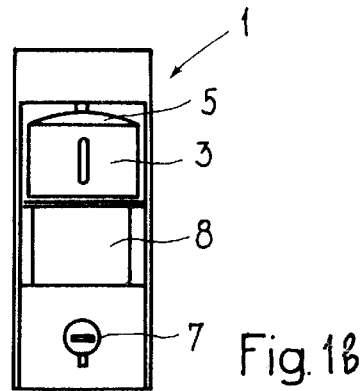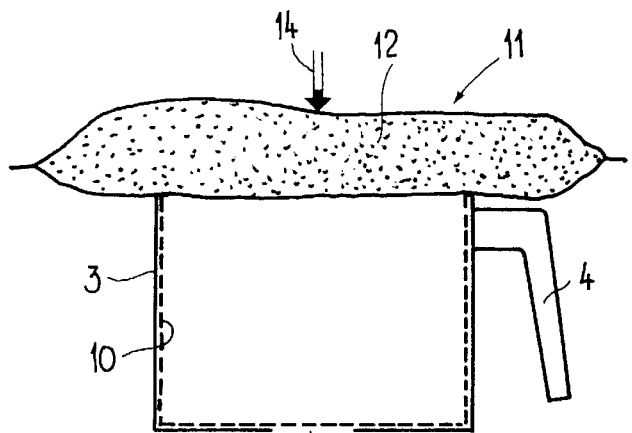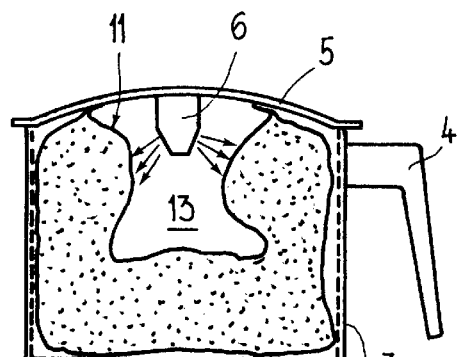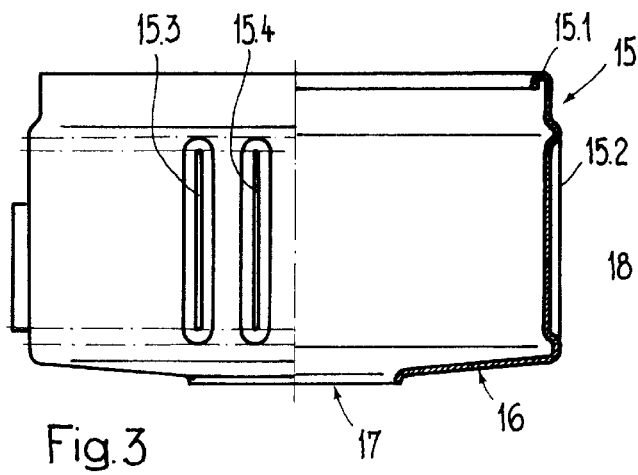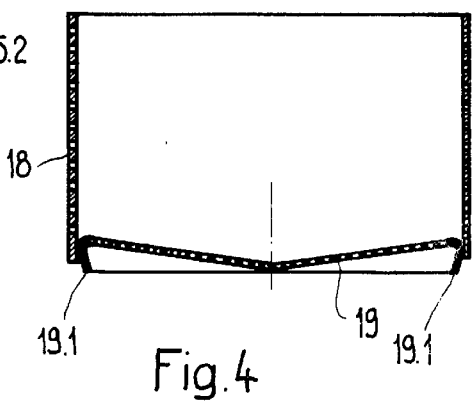

COFFEE MAKER

PRIOR ART

Coffee makers for aircraft must be designed such they can produce as large an amount of good coffee as possible with little space requirement and low operating cost. Handling should be as simple as possible and should not lead to dirty hands.

Among others, a coffee maker is known in which the powdered coffee packed in an aluminum can can be used. A nozzle is pushed from overhead through the cover. At the same time several points are driven into the bottom and enable the coffee to flow out. Using the nozzle hot water is injected into the can. It mixes with the powdered coffee and dissolves out the flavors. The coffee water can flow out through the slots between the tips and the penetrated can bottom in order to be collected in a container. With one can several liters of coffee can be produced in this way. After use the can with the spent coffee is removed as a whole from the machine and discarded.

This approach is certainly very clean, but due to the large amount of refuse it is not especially environmentally-friendly. Furthermore, the weight of the throw-away can be anything but ignored in view of the large amounts of coffee needed by the airline.

DESCRIPTION OF THE INVENTION

The object of the invention is to devise a coffee maker which enables simple, clean handling and which avoids the refuse problems in the prior art.

A coffee maker according to the invention has a container for holding powdered coffee which can be closed pressure-tight, the container having a screen on the inside on the bottom and side wall in order to be able to hold the powdered coffee in a closed filter pouch and to enable the coffee to flow out.

The invention is therefore no longer based on the material-intensive one-way cans, but sets on the filter pouch which is very environmentally friendly with respect to packaging. One such filter pouch contains a larger amount of coffee (for example, 100–400 g) so that with it several liters of good coffee can be produced. Similarly to the known throwaway can system, personnel do not come into contact with the coffee powder in the invention either. Therefore the powdered coffee cannot be spilled.

The screen according to the invention should not be confused with a filter. It is not used to filter the coffee, but only to hold the filter bag such that the coffee (emerging from the filter pouch) can flow out easily on the outside so that hot water is not prevented from penetrating through the filter pouch. If specifically the hot water cannot take this path, it will flow out anywhere around the filter pouch; this will lead to watery coffee.

Preferably the screen is formed on the inside to be axially-or rotationally symmetrical. This ensures a uniform coffee quality since the filter pouch can be uniformly distributed on the inside of the screen. Preferably the container is cylindrical (basket-shaped) and can be closed with a cover which on the inside has a nozzle head for injection of hot water. The cover is attached in the coffee maker and can be removed at most for examination purposes. To operate the coffee maker only the basket can be removed from it.

Preferably there is a manual or automatic mechanism for raising the pan against the cover and closing the two parts pressure tight. In this way the invention can be used without significantly changing the existing known coffee machine. Introduction of the system according to the invention therefore does not entail any great investment.

Of course, lowering the cover onto the pan is not precluded.

The pan is preferably made in one piece. The screen therefore should not come loose when the used filter pouch is knocked out of the pan.

Differently than in the known coffee makers, nozzles with an angle of roughly 45° (instead of 90° as in the prior art) with respect to the center axis of the cover are preferable. They provide for the inserted filter pouch to be penetrated by water as much as possible from the inside to the outside. This measure also contributes to uniformly good coffee quality.

A filter pouch with powdered coffee for use in a coffee maker of the type according to the invention is flat and round. It is only partially filled (but not to bursting) with coffee. Its diameter is greater than the diameter of the pan so that it can cover not only the bottom of the pan, but also its wall. How much greater the diameter of the filter pouch should be depends on the ratio of height to diameter of the pan.

The invention is especially well suited to implementation in built-in coffee makers in aircraft which are designed with a direction connection to the pressure water piping system. The pressure piping system has a working pressure of for example 1 bar. The container for the filter pouch must be designed for this pressure. Of course, other commercial applications (in cafeterias, conventions, etc.) are also conceivable.

In order to place the filter pouch which is much larger than the diameter of the basket in the latter, it is first preferably placed in the center of the basket and then pressed downward (into the basket) in the middle. The pouch will then abut (peripherally) the inside wall and form a free space for the nozzle head in the center.

Other advantageous embodiments and combinations of features follow from the detailed description and the totality of the patent claims.

BRIEF DESCRIPTION OF THE DRAWINGS

In the following the invention will be detailed using embodiments and in conjunction with the drawings.

FIGS. 1*a, b* shows a schematic of a built-in coffee maker with the basket in the lowered or raised position;

FIGS. 2*a, b* shows a schematic of the basket with the filter pouch inserted;

FIG. 3 shows a basket according to the invention without the screen insert in cross section;

FIG. 4 shows a screen insert for the basket according to FIG. 3.

Basically, in the drawings the same parts are provided with the same reference numbers.

IMPLEMENTATION OF THE INVENTION

FIGS. 1*a*, 1*b* shows built-in coffee maker 1 according to the invention from the front. In interior 2 which is open to the front is cover 5 mounted stationary with centrally arranged nozzle head 6. Cover 5 is attached to the cover or in the upper area of interior 2. Basket 3 with handle 4 can be inserted into interior 2 or removed from it. It sits on lifting mechanism 8. In FIG. 1*a* lifting mechanism 8 is lowered and therefore not visible. Basket 3 can be removed and filled with filter pouch 11 (compare FIGS. 2*a, b*).

In the lower part coffee maker 1 has outlet cock 7 at which the finished coffee can be tapped.

If lifting mechanism 8 is actuated, basket 3 is raised up against cover 5 until basket 3 and cover 5 form a tightly sealed container. In this state hot water is injected through nozzle head 6 and the finished coffee collects underneath of basket 3. (Coffee maker 1 is connected in the conventional manner to a water supply system or a pressure water line).

FIGS. 2a, b shows how filter pouch 11 according to the invention is inserted into basket 3. Filter pouch 11 is a large, round, flat pouch filled loosely with powdered coffee 12, made of filter paper or the like. The diameter of filter pouch 11 is greater than that of cylindrical basket 3. In a first step therefore filter pouch 11 is placed centrally on the upper edge of basket 3 (compare FIG. 2a). Then it is pressed in the center into basket 3 (arrow 14) and placed against the bottom and wall of basket 3 or its inside screen 10. The bottom and wall of the container will be fully lined by filter pouch 11. Free space 13 remains in the center. In it the nozzle head 6 sprays hot water. On the one hand, by basket 3 being equipped on the inside over its entire surface with screen 10 and on the other hand filter pouch 11 entirely covering the bottom and wall of basket 3, the injected hot water can only penetrate through filter pouch 11 to the outside. It collects outside of screen 10 and flows through central hole 9 in the bottom of basket 3.

If the desired amount of coffee is produced, lifting mechanism 8 is lowered, basket 3 and wet filter pouch 11 are removed (for example, by striking the edge of basket 3 against the edge of a trash can).

FIG. 3 shows another preferred embodiment of a basket according to the invention. It has a cylindrical jacket 15 and conically bevelled bottom 16. On the upper edge jacket 15 has edge 15.1 folded down to the inside and downward. Distributed along the periphery ribs 15.2, 15.3, 15.4 running furthermore in the axial direction are molded into jacket 15. In the center, bottom 16 finally has opening 17.

On the one hand, according to FIG. 3 jacket screen 18 (compare FIG. 4) and on the other hand bottom screen 19 can be inserted into the basket. Jacket screen 18 is held in the basket by folded-down edge 15.1. Bottom screen 19 is recessed similarly to bottom 16 from the outer edge against the center.

Jacket screen 18 and bottom screen 19 consist for example of a 1 mm thick sheet with screen holes of roughly 0.5 to 2 mm in diameter. Ribs 15.2, . . . , 15.4 keep jacket screen 18 at a minimum distance to jacket 15 so that the coffee can flow out. Bottom screen 19 is held for example by edge 19.1 folded down to the bottom at a distance to bottom 16.

The basket typically has a diameter of 10–15 cm and a height of 5–10 cm. With this volume 3–4 liters of coffee can be produced with the invention.

The invention is not limited to the described embodiment. Thus the basket need not necessarily be cylindrical. In particular, it can also be slightly conical. To close the container the cover can be brought by a lowering mechanism onto the basket. The cover and basket can be joined to one another via a hinge. However, this is somewhat disadvantageous for handling.

By the powdered coffee being enclosed in a very fine-porous filter pouch, it can be ground more finely than in the prior art. With the same coffee quality roughly 10% less powder can be used.

Since the invention dispenses with aluminum cans, a weight savings arises which is beneficial for large amounts of coffee. The weight savings is limited not only to the material to be prepared, but also to the refuse. Finally, production and disposal of filter pouches take much less energy than those of aluminum cans.

In summary it can be stated that an environmentally-friendly system for production of large amounts of coffee has been created by the invention.

We claim:

1. A coffee maker comprising:
   a basket including a first space therein and a drain opening;
   a cylindrical screen including a peripheral wall arid a bottom and being disposed in said first space, thereby covering said drain opening;
   a filter pouch containing coffee, said filter pouch arranged within said screen so as to cover said bottom and at least a portion of said peripheral wall while defining a second space therein over said coffee in a portion of said filter pouch covering said bottom of said screen, said second space being additionally partially defined about a periphery thereof by said coffee in a portion of said filter pouch covering said at least a portion of said peripheral wall;
   wherein said second space in shaped so as to receive a water nozzle therein.

2. The coffee maker according to claim 1, wherein said screen is integral with said basket.

3. The coffeemaker according to claim 1, wherein said screen is detachably mounted within said basket.

4. The coffee maker according to claim 1, further comprising a cover provided with said water nozzle.

5. The coffee maker according to claim 4, wherein said water nozzle is constructed and arranged to radially project water onto a surface of said filter pouch defining said second space.

6. The coffee maker according to claim 4, wherein said water nozzle is constructed and arranged to radially project water at a 45° angle with respect to vertical.

7. The coffee maker according to claim 1, wherein said basket is round in transverse cross section, and said filter pouch is disk-shaped and has a diameter larger than a diameter of said basket.

8. The coffee maker according to claim 1, further comprising:
   a brewed coffee storage portion located below said basket having said screen and said coffee pouch therein so as to be able to collect brewed coffee falling from said drain opening;
   a cover for said basket, said cover being provided with a water nozzle;
   means for providing hot water to said water nozzle; and
   a basket lifting mechanism having a surface on which said basket is received, said lifting mechanism being constructed and arranged to alternatively raise said basket upwardly so as to be closed by said cover and lower said basket whereby said basket can be removed from said surface, said basket lifting mechanism including means for conveying coffee draining from said basket to said brewed coffee storage portion.

9. The coffee maker of claim 8, wherein said brewed coffee storage portion includes an outlet cock by which brewed coffee is drained from said brewed coffee storage portion.

10. The coffee maker of claim 1, wherein said filter pouch is made from filter paper.

11. The coffee maker of claim 3, wherein said peripheral wall includes an inwardly projecting rib constructed and arranged to space said screen away from said peripheral wall.

12. The coffee maker according to claim 1, wherein said filter pouch covers said peripheral wall, such that said second space is partially defined about a periphery thereof by said coffee in said portion of said filter pouch covering said peripheral wall.

* * * * *